US010633263B2

(12) United States Patent
Cote et al.

(10) Patent No.: US 10,633,263 B2
(45) Date of Patent: Apr. 28, 2020

(54) CONVERSION OF MEDIA FILTER INTO MEMBRANE GRAVITY FILTER

(71) Applicant: General Electric Company, Schenectady, NY (US)

(72) Inventors: Pierre Lucien Cote, Dundas (CA); Jason Cadera, Guelph (CA); Steven Kristian Pedersen, Burlington (CA); Nicholas William H. Adams, Oakville (CA)

(73) Assignee: BL TECHNOLOGIES, INC., Minnetonka, MN (US)

(*) Notice: Subject to any disclaimer, the term of this patent is extended or adjusted under 35 U.S.C. 154(b) by 162 days.

(21) Appl. No.: 15/550,611

(22) PCT Filed: Mar. 4, 2016

(86) PCT No.: PCT/US2016/021030
§ 371 (c)(1),
(2) Date: Aug. 11, 2017

(87) PCT Pub. No.: WO2016/167898
PCT Pub. Date: Oct. 20, 2016

(65) Prior Publication Data
US 2018/0037473 A1 Feb. 8, 2018

Related U.S. Application Data

(60) Provisional application No. 62/149,070, filed on Apr. 17, 2015, provisional application No. 62/210,915, (Continued)

(51) Int. Cl.
*C02F 1/28* (2006.01)
*C02F 1/44* (2006.01)
(Continued)

(52) U.S. Cl.
CPC .............. *C02F 1/283* (2013.01); *B01D 61/20* (2013.01); *B01D 65/02* (2013.01); *B01D 65/10* (2013.01);
(Continued)

(58) Field of Classification Search
CPC ...... C02F 1/283; C02F 1/444; C02F 2303/16; C02F 1/44; C02F 1/48; B01D 61/20;
(Continued)

(56) References Cited

U.S. PATENT DOCUMENTS 6,228,271 B1    5/2001   Cote
6,325,928 B1   12/2001   Pedersen et al.
(Continued)

FOREIGN PATENT DOCUMENTS

RU        116144 U1     5/2012
WO       0006500 A1    2/2000

OTHER PUBLICATIONS

Akhondi et al., "Gravity-Driven Membrane Filtration as Pretreatment for Seawater Reverse Osmosis: Linking Biofouling Layer Morphology with Flux Stabilization," Water Research, Mar. 2015, vol. 70 (1), pp. 158-173.
(Continued)

*Primary Examiner* — David C Mellon

(57) ABSTRACT

A conventional media filter such as a gravity sand filter is converted into a membrane filter. The media is removed and replaced by immersed membrane modules. Transmembrane pressure is created by a static head pressure differential, without a suction pump, thereby creating a membrane gravity filter (MGF). Preferred operating parameters include transmembrane pressure of 5-20 kPa, 1-3 backwashes per day, and a flux of 10-20 L/m²/h. The membranes are dosed with chlorine or another oxidant, preferably at 700 minutes*mg/L as $Cl_2$ equivalent per week or less. The small oxidant does is believed to provide a porous biofilm or fouling layer without substantially removing the layer. The media filter may be modified so that backwash wastewater is removed from near the bottom of the tank rather than through backwash troughs above the membrane modules. Membrane integrity testing may be done while the tank is emptied after a backwash.

5 Claims, 5 Drawing Sheets

Related U.S. Application Data filed on Aug. 27, 2015, provisional application No. 62/233,812, filed on Sep. 28, 2015.

(51) Int. Cl.
  *B01D 65/02* (2006.01)
  *B01D 65/10* (2006.01)
  *B01D 61/20* (2006.01)

(52) U.S. Cl.
  CPC .......... *C02F 1/444* (2013.01); *B01D 2315/06* (2013.01); *B01D 2321/04* (2013.01); *B01D 2321/16* (2013.01); *B01D 2321/168* (2013.01); *B01D 2321/185* (2013.01); *B01D 2325/28* (2013.01); *C02F 2303/16* (2013.01)

(58) Field of Classification Search
  CPC .. B01D 65/10; B01D 65/02; B01D 2321/168; B01D 2321/185; B01D 2321/16; B01D 2315/06; B01D 2325/28; B01D 2321/04; B01D 61/14; B01D 61/18; B01D 61/22; B01D 61/145; B01D 61/142; B01D 61/147; B01D 61/58; B01D 63/02; B01D 63/04; B01D 2311/2626; B01D 2313/20
  See application file for complete search history.

(56) References Cited

U.S. PATENT DOCUMENTS

| | | | |
|---|---|---|---|
| 6,838,003 B1 * | 1/2005 | Espenan | B01D 63/046 210/170.01 |
| 6,893,568 B1 | 5/2005 | Janson et al. | |
| 2004/0245174 A1 * | 12/2004 | Takayama | B01D 61/18 210/636 |
| 2006/0108275 A1 * | 5/2006 | Cote | B01D 61/18 210/321.6 |
| 2007/0102339 A1 * | 5/2007 | Cote | B01D 61/18 210/321.69 |

OTHER PUBLICATIONS

International Patent Application No. PCT/US2016/021030, International Preliminary Report on Patentability dated Oct. 26, 2017.
International Patent Application No. PCT/US2016/021030, International Search Report and Written Opinion dated Aug. 17, 2016.
Peter-Varbanets, M., et al., Stabilization of Flux during Dead-end ultra-low Pressure Filtration, Water Research, 44:3607-3616, 2010.
Derlon, N., et al., "Activity of Metazoa Governs Biofilm Structure Formation and Enhances Permeate Flux during Gravity-Driven Membrane (GDM) Filtration", Water Research 47:2085-2095, 2013.
Tang, Guoqing and Norman R. Morrow, "Oil Recovery by Waterflooding and Imbibition—Invading Brine Cation Valence and Salinity", SCA-9911, 1999.
European Patent Application No. EP16710070.0, Office Action dated May 20, 2019.
Gulf Cooperation Council Application No. CG 2016-31162, Examination Report dated Jan. 16, 2019.
Russian Patent Application No. 2017132984, Office Action and Search Report dated May 23, 2019—English Translation Available.

* cited by examiner

CONVERSION OF MEDIA FILTER INTO MEMBRANE GRAVITY FILTER

RELATED APPLICATIONS

This application is a National Stage Entry of International Application No. PCT/US2016/021030, filed Mar. 4, 2016, which claims the benefit of U.S. Provisional Patent Application Nos. 62/149,070 filed on Apr. 17, 2015; 62/210,915 filed on Aug. 27, 2015; and, 62/233,812 filed on Sep. 28, 2015 and claims priority from U.S. patent application Ser. No. 14/711,060 filed on May 13, 2015 and Ser. No. 14/721,549 filed on May 26, 2015, all of which are incorporated by reference.

FIELD

This specification relates to water treatment and to membrane filtration.

BACKGROUND

A conventional media filter has a bed of media laid over a drainage system. The most common media filter in municipal drinking water plants is a gravity sand filter, also called a rapid sand filter, in which the media is sand. The drainage system (also called an underdrain) may be, for example, a grid of drainage pipes covered in gravel or a perforated platform, optionally covered with a layer of gravel. Feed and backwash water troughs cross the tank above the bed of sand. Water fed into the tank from the troughs flows through the sand bed and into the underdrain. The bed is periodically backwashed by feeding water, and optionally compressed air, in through the drainage pipes and collecting backwashed water in the troughs. This type of filter is commonly used in municipal drinking water filtration plants.

Membrane filters use a permeable membrane to filter water. In municipal drinking water plants, the membrane pore size is usually in the ultrafiltration or microfiltration range. In immersed systems, the membrane modules are placed in an open tank and permeate is withdrawn from the inside of the membranes. One commercial product is the ZEEWEED™ 1000 (also called ZW 1000) module sold by GE Water & Process Technologies. These modules are generally as described in U.S. Pat. No. 6,325,928, Immersed Membrane Element and Module, and U.S. Pat. No. 6,893,568, Immersed Membrane Filtration System and Overflow Process, which are incorporated herein by reference. US Patent Application Publication 2006/0108275 A1 describes a kit to integrate an immersed membrane into an existing sand filter and is also incorporated herein by reference.

SUMMARY

This specification describes an immersed membrane filtration system and method of operation. The system could be newly constructed, but it will be described herein as the conversion of a conventional gravity sand filter into a membrane filter. In this case, the granular media of a gravity filter bed is replaced with immersed membranes.

In a filtration process described herein, the immersed membranes are operated like a rapid sand filter in one or more respects. For example, the membranes may be operated without a permeate pump. Transmembrane pressure to cause a flow of permeate through the membrane is optionally created by a static head differential, for example the difference in elevation between a free surface of water in the tank over the membranes during filtration and at a permeate discharge point to atmosphere. The transmembrane pressure (TMP) is optionally 20 kPa or less. Since filtration is driven by gravity, the apparatus may be called a membrane gravity filter (MGF). Optionally, the membranes may also be operated with a backwash frequency and recovery similar to a rapid sand filter.

In another process described herein, water is filtered through immersed membranes at a flux of 20 L/m$^2$/h or less. The membranes are backwashed, optionally not more than 5 times per day. One or more backwashes in a day include chlorine or another chemical agent a dose effective to increase the porosity of a biofilm or fouling layer without substantially killing or removing the layer. For example, there may be a weekly dosage of 700 or less, preferably 500 or less, minutes*mg/L as $Cl_2$. Regenerative cleaning is avoided completely, or at least for an extended period of time such as 6 months or more.

A filtration system described herein has a tank drainage system separate from its permeate withdrawal system. In a process used with this system, backwash water is removed from a drainage system below the membrane modules after backwashing rather than through backwash troughs above the membrane modules. The integrity of the membranes is optionally tested while the tank is empty.

Optionally, a filtration system may include a bed of sorption media. The sorption media may be located above the membrane modules and the modules may be configured such that backwash water flows preferentially upwards from the modules and through the adsorption media. A process described in this specification includes steps of backwashing the membrane modules and creating an up-flow of water through the modules, optionally sufficient to expand the adsorption media. Optionally, these steps may be followed by a step of draining the tank.

DETAILED DESCRIPTION

Figure 1:
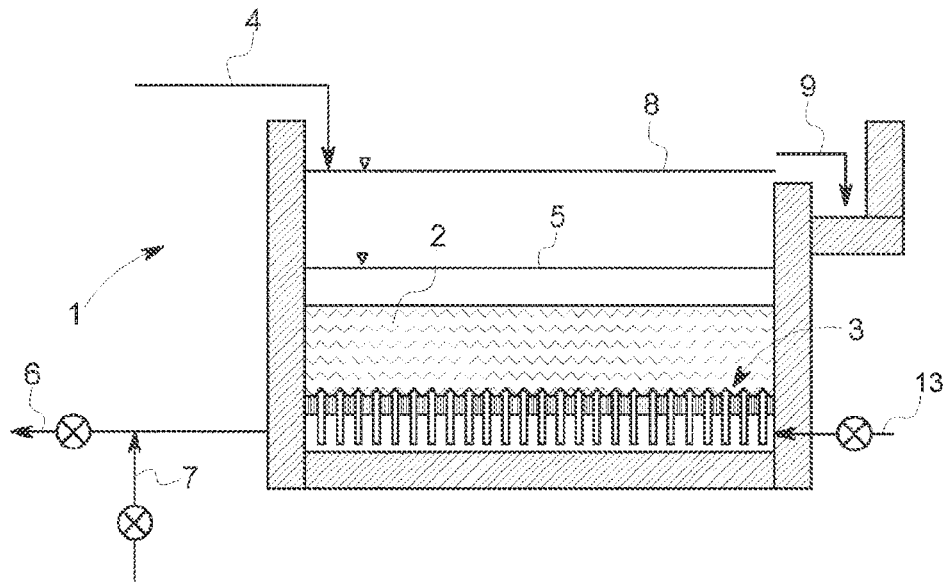
FIG. 1 is a cross section of a generic media filter (prior art).

The cross-section of a generic high-rate media filter 1, alternatively called a gravity filter) is shown in FIG. 1. In municipal water filtration, a media filter 1 typically contains a media bed 2 with 0.5-1.5 m with one or two filtration media. The media bed 2 is supported by an underdrain system 3. During filtration, feed water 4 is added from above the media bed 2 and a free water surface is maintained at filtration water level 5. Filtered water 6 is collected in or below the underdrain system 3. During periodic backwashing, backwash water 7, and optionally air 13, flow upwards through the underdrain system 3 and media bed 2 and the free water surface reaches a backwash level 8. Dirty backwash water 9 overflows and leaves the media filter 1. Filtration can be at constant flow rate (increasing filtration head) or declining rate (constant filtration head). Filtration head is controlled by varying the level of water in the filter, or by imposing a pressure loss on the filtrate side. Backwashing is initiated by operating valves to reverse the flow through the filter and evacuate the dirty backwash water 9, typically through troughs located above the bed or on the side of the filter box. Backwashing can be aided by injecting air, horizontal surface washing or both.

Membranes used to retrofit a media filter can be any microfiltration (MF) or ultrafiltration (UF) membranes that can be immersed. The modules can have a rectangular cross-section in plan view such as the ZEEWEED™ 1000 module from GE Water & Process Technologies. Rectangular (optionally square) modules can be placed side by side in a grid and occupy close to the entire tank footprint surface area. Water can flow through the ZW1000 modules either upwards or downwards. Alternatively, modules can have a circular cross-section such as Toray's HSU-1515, Memcor's CS and Asahi's UHS-620A modules. Given their circular geometry, a grid of these modules leaves open vertical columns between the modules. Feed water enters through the sides of the modules, backwash water exits from the sides of the modules and optional air can enter through the bottom of the modules.

Figure 2A:
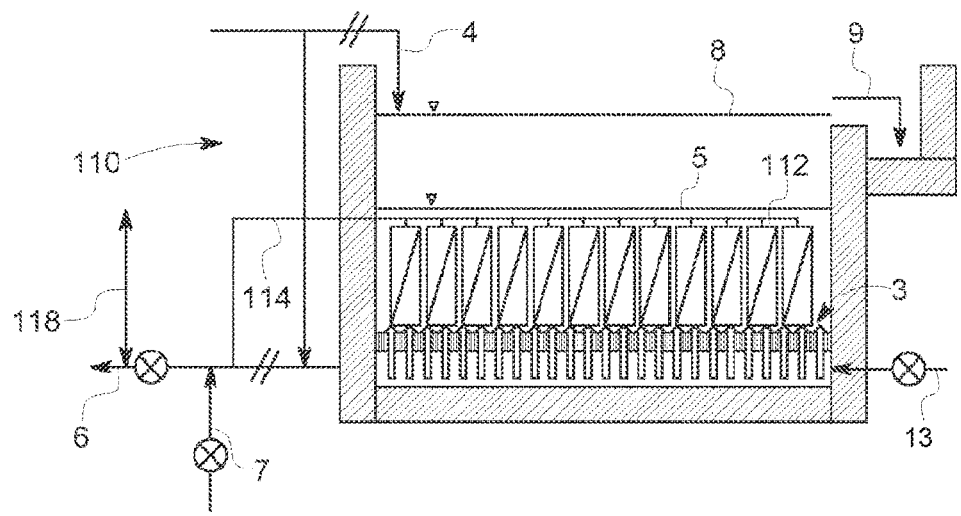
FIG. 2A is a cross section of a media filter retrofit with immersed membranes to make a membrane gravity filter with a permeate collector at the top of the membranes.
Figure 2B:
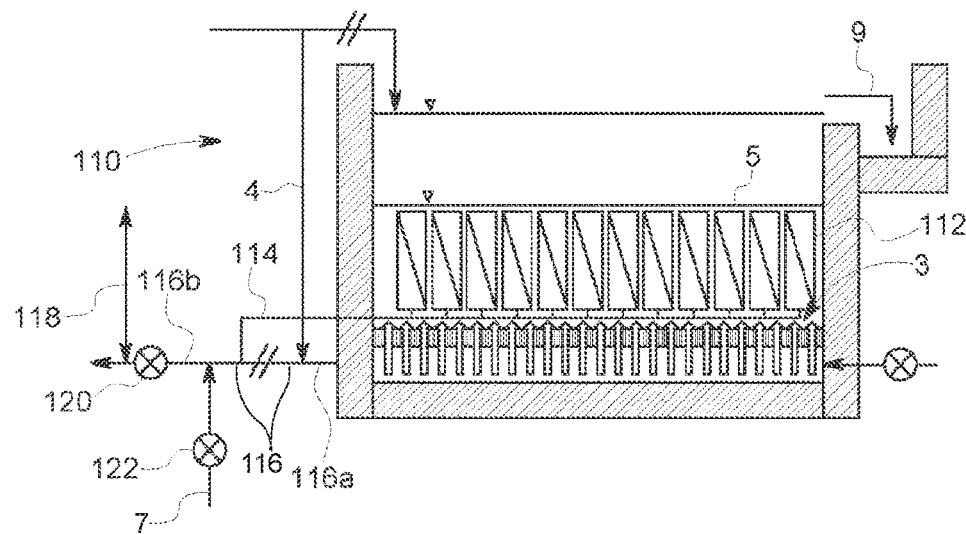
FIG. 2B is a cross section of a media filter retrofit with immersed membranes to make a membrane gravity filter with a permeate collector at the bottom of the membranes.

FIGS. 2A and 2B show two options for retrofitting a media filter 1 with membrane modules 112 to produce a membrane gravity filter 110. In these cases, the membrane modules 112 replace the media bed 2 of FIG. 1 with minimal modifications, for example without modifying the underdrain system 3. If the media filter 1 did not include air sparging to enhance backwash, an aeration grid can be laid down first under the membrane modules 112. Trays or frames can also be laid down onto the underdrain system 3 to control module spacing or otherwise assist in holding or leveling the membrane modules 112. In FIG. 2a, membrane modules 112 are installed side by side to cover the entire surface area of the filter floor. The membrane modules 112 are optionally installed one by one or in small units (i.e., they are not pre-assembled into large cassettes) to avoid the need for cranes or other heavy lifting equipment. Permeate ports of the membrane modules 112 are then connected to a permeate header 114, which includes a lateral section laid horizontally on top of the membrane modules 112. There might be several rows of membrane modules 112. In that case, a master section of the permeate header 114, for example at the end of the tank, can be used to connect multiple lateral sections together. The permeate header 114 either goes through the tank wall (as shown in FIG. 2A) or over the wall in a siphon arrangement (not shown). Alternatively, each section can go through or over the tank wall and be connected to a master section outside the tank.

With a permeate header 114 above the membrane modules 112, air that is released on the permeate side of the membranes can be evacuated with permeate. However, the permeate header 114 might have to be removed to replace a membrane module 112. In FIG. 2A, the permeate header 114 is installed on the underdrain system 3 before the membrane modules 112 are installed. The permeate header 114 is located below the membrane modules 112. In this case, the permeate header 114 does not need to be moved to remove a membrane module 112. However, air released on the permeate side of the membranes might not be entrained in permeate flow and could collect inside a membrane module 114. To remove collected air, a network of small tubing in communication with the top of the membrane modules 112 (not shown) can be added and used to remove air, for example by venting the air during a backwash.

The piping of the media filter 1 is also reconfigured in order to complete the conversion of the media filter 1 to a membrane gravity filter 110. For example, as shown in FIGS. 2A and 2B, an underdrain outlet pipe 116 and feed water 4 pipe are cut and capped where indicated by the forward marks ("//"). The feed water 4, which was previously fed to the top of the media filter 1, is redirected and fed into the underdrain system 3 through a first part 116*a* of the underdrain outlet pipe. The membrane permeate header 114 is connected to a second part 116*b* of the underdrain outlet pipe. Optionally, a backwash water 7 inlet is connected to the permeate header 114, for example through the second part 116*b* of the underdrain outlet pipe.

With these changes, the former media filter 1 can now operate as a membrane gravity filter, optionally without changes to other physicals feature of the media filter 1 or the operation and control method. Feed water 4 now enters the membrane gravity filter 110 through the underdrain system 3 and flows up to the membranes modules 112 to be filtered dead-ended. The filtration head 118 is provided by static head differential across the membrane, for example the difference between the level of water in the tank (filtration level 5) and the level of a permeate discharge point to atmosphere or the water level in a permeate collection tank if the permeate discharge point is submerged. A backwash can be initiated periodically, for example once the filtration head 118 reaches a specified level, or at a maximum time between backwashes if reached first. While backwashing, a filtered water valve 120 is closed and a backwash water valve 122 is open. During a backwash, the feed flow optionally continues interrupted and assists in carrying the dislodged solids out of the tank as dirty backwash 9, for example by overflow to a trough. The backwash network of a typical media filter is designed to handle a flow rate 2-4 higher than the filtrate network. Accordingly, introducing the feed water 4 into the membrane gravity filter 110 through the backwash network is not likely to restrict the feed water flow rate.

Table 1 compares typical operating parameters for a conventional immersed membrane system with a membrane gravity filter. One difference between the operation of a conventional membrane system and a membrane gravity filter is in relation to flux. Fouling increases rapidly, possibly exponentially, with flux. Operating at low flux requires only low transmembrane pressure, which enables gravity operation even with the very low filtration head available in a conventional rapid sand filter, for example 2.5 m or less or 2.0 m or less. Operating at low flux also reduces the need for backwashes to or near the frequency range typical of media filters such as rapid sand filters.

TABLE 1

Comparison of a conventional membrane system to a membrane gravity filter.

| Parameter | Conventional Membrane System | Membrane Gravity Filter |
|---|---|---|
| Typical flux (L/m²/h) | 30-100 | 10-15, possibly 20 |
| Driving force source | pump pressure | gravity (static head differential) |
| Transmembrane pressure (kPa) | 30-200 | 5-20 |
| Backwash interval (h) | 0.25-1.0 | 8-24 |
| Feed flushing during backwash | yes | optional |
| Recovery | 90-95% | 95-98% |
| Air-assisted backwash | yes | yes |
| Chemical-enhanced backwash | yes | optional |
| Regenerative chemical cleaning | yes | optional |

As indicated in Table 1, a gravity membrane filter can optionally operate in the absence of regenerative chemical cleaning, also called recovery cleaning. In regenerative chemical cleaning the membranes are contacted with a chemical cleaning agent for an extended time, such as 15 minutes or more. The intent of regenerative chemical cleaning is to kill or removing a substantial part of a biofilm or fouling layer, and to restore membrane permeability for example to within 20% of the permeability of the membrane when new. In a conventional membrane system, regenerative cleaning is typically performed on a weekly to monthly basis. However, as discussed further below, the membrane gravity filter can operate indefinitely, or at least for an extended period of time or 6 months or more or 12 months or more, without regenerative chemical cleaning. In this mode of operation, membrane permeability declines from permeability when new but reaches an acceptable steady state. Fouling or biofilm layers are allowed to reach a steady-state rather than being continuously removed to restore near-new membrane permeability.

Some recent research has shown that in the absence of regenerative chemical cleaning membrane flux does not go to zero, but stabilizes at a low value that is typically less than 10 L/m²/h. Peter-Varbanets et al (2010) operated membrane systems by gravity, without any backwashing, flushing or chemical cleaning, on different types of water with increasing TOC contents. Fluxes stabilized between 4-10 L/m²/h at a filtration pressure of 0.40-0.65 m of water column. Stabilized fluxes decreased with increasing TOC. They demonstrated that biological activity of the biofilm contributed to stabilizing fluxes. The formation of cavities, channels and dendrite-like structures was observed in the fouling layer, starting after about one week of operation. Derlon et al (2013) showed that flux stabilized in gravity-driven filtration to a range of 8-10 L/m²/h at a filtration pressure of less than 0.65 m of water column. They correlated the activity of metazoan and their impact on biofilm structure to achievable flux. In both cases, a steady-state flux was achieved after the biofilm was conditioned by letting higher microorganisms develop. These methods are therefore dependent on factors such as the nature of the organic matter present in the feed water, any inhibitory compounds, and temperature. The required factors would be difficult to provide consistently in a municipal water treatment plant. Furthermore, the fluxes obtained were not likely sufficient to allow a membrane gravity filter to provide the same yield as a rapid sand filter.

Figure 3:
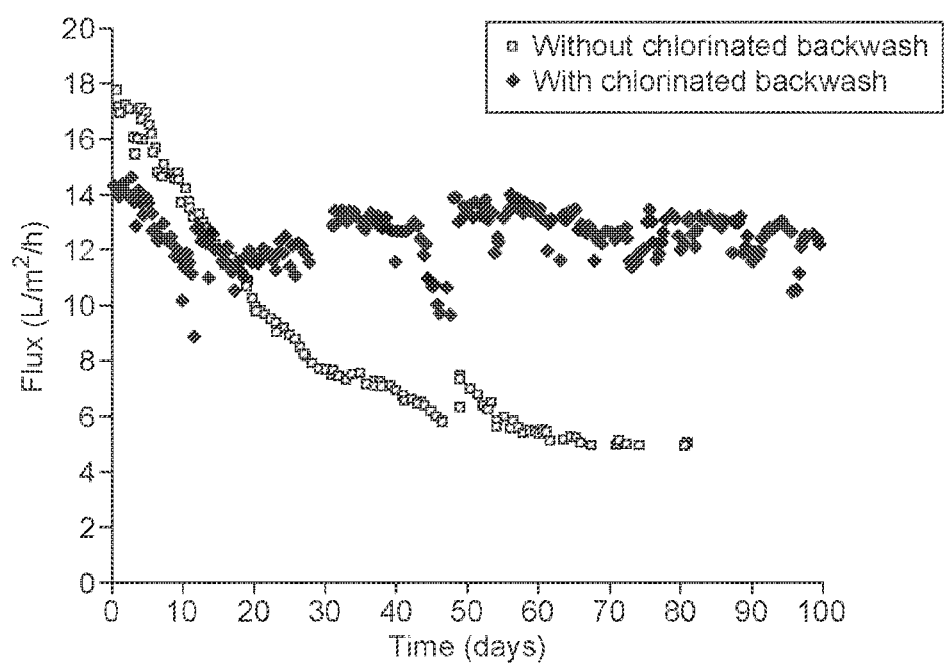
FIG. 3 is a graph showing flux over time while using a membrane gravity filter to treat surface water with and without chlorine added to the backwash water.

In the membrane gravity filter, flux is improved with a low dose of oxidant provided periodically in backwash water. Without intending to be limited by theory, the inventors believe that the oxidant, in effective doses, does not remove a biofilm or fouling layer as in regenerative chemical cleaning but instead makes the biofilm or fouling layer more porous in a sense analogous to the activity of higher microorganisms. In a side-by-side experiment, gravity membrane filtration under a constant head of 1.5 m was tested with and without a small concentration of chlorine (10 mg/L) in a daily 5 minute backwash. Chemical dose was 350 minutes*mg/L as $CL_2$ per week. The feed water was surface water, drawn from a lake. The membrane modules were pilot scale variants of ZW 1000 modules, which have horizontally oriented hollow fiber ultrafiltration or microfiltration membranes with nominal 0.04 micron pore size. The results in FIG. 3 show that the steady-state flux reached without chlorine was only 5 L/m²/h, while with the small dose of chlorine the steady state flux improved to 12-14 L/m²/h. The low concentration and contact time provided by the chlorinated backwash was not sufficient to clean the membranes. However, the inventors believe that the chlorine was effective in conditioning the biofilm or fouling layer to make it more permeable. Conditioning the fouling layer or biofilm with a daily (or other) dose of oxidant is expected to be more controllable and reliable than relying on higher microorganisms.

While other oxidants are expected to produce similar results, chlorine is the most common final disinfectant in a water treatment plant and is normally added just downstream of media filters as a final disinfectant. Accordingly, a small dose of chlorine in backwash water in a membrane gravity filter is not expected to raise regulatory or health concerns. The use of an alternative final disinfectant, such as chlorine dioxide or chloramines, in the backwash is also possible.

Figure 4:
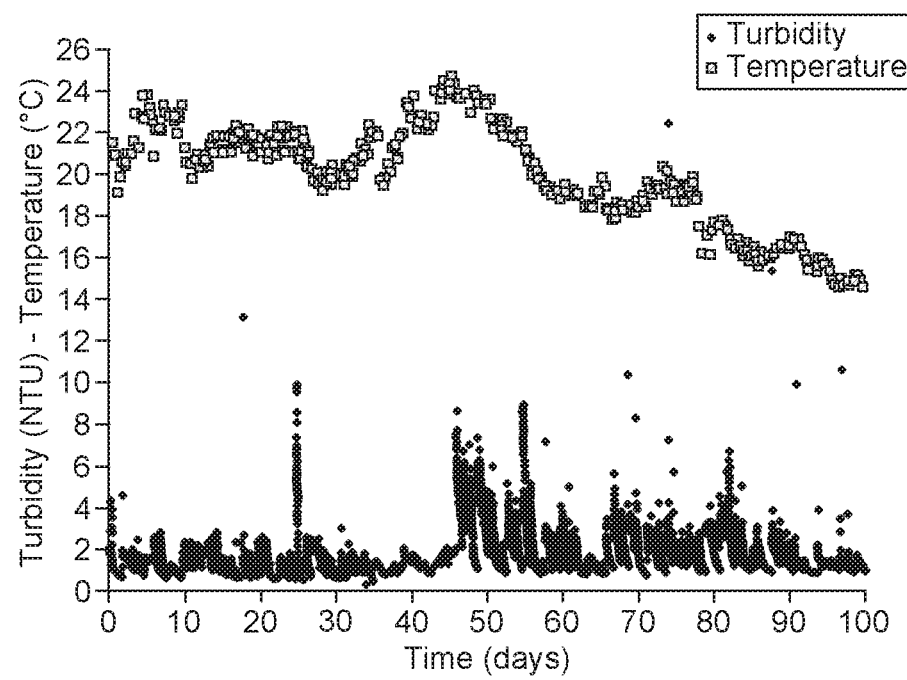
FIG. 4 is a graph showing turbidity and temperature over time for the water used in the experiment of FIG. 3.

FIG. 4 shows the turbidity and temperature over time of the feed water treated in the experiment described above. As shown in FIG. 4, the results in FIG. 3 were obtained while filtering raw surface water that had a turbidity averaging 2-3 NTU, with peaks up to 10 NTU. It is likely that a higher steady-state flux could have been achieved after coagulation and settling or other conventional pre-treatment, wherein turbidity of feed water could be reduced to 0.5 NTU or less.

Testing as described in relation FIG. 3 but with the chlorinated backwash only was continued for another 300 days to a total of 400 days. There was no regenerative cleaning of the membranes at anytime during the test. During winter, the feed water temperature dropped to between 2 and 4 degrees C. for about 75 days. During this time, average flux declined to roughly 10 L/m²/h. Flux increased to a range of about 12-14 L/m²/h after the feed water warmed back up to 15 degrees C. and above. This pilot system has been operating for about 22 months without regenerative chemical cleaning.

The flux results in FIG. 3 suggest that a conventional media filter converted to a membrane gravity filter will provide at least a similar yield without increasing footprint (tank area). Water quality can typically be improved by using a membrane since a membrane has a much lower cut-off as compared to a media filter (0.01-0.1 μm for MF/UF membranes versus 5-10 μm for media filtration). Converting a media filter to a membrane gravity filter is therefore also likely to increase filtered water quality, which might benefit downstream treatment processes such as reverse osmosis.

Further tests were conducted using commercially available ZW 1000 modules to filter surface water, including both 42 m² (450 square foot) and 51 m² (550 square foot) versions. Flux produced over a 6-month trial period typically ranged from 13-20 L/m²/h. The feed water temperature during the trails ranged from about 4-26 degrees C. while turbidity ranged from about 0.2 to 2 NTU but with frequent spikes to 4 or more NTU. These modules were backwashed every 8 hours. Recovery rate was 97-98%. The tank was filled with water to a depth of 1 m. The permeate outlet was level with the bottom of the tank and discharged to atmospheric pressure resulting in a TMP of 10 kPa. Chemical dose was 350 minutes*mg/L as $CL_2$ per week. The membranes were not recovery cleaned during the 6-month trial.

Conventional media filters are typically designed with a filtration velocity of 5-15 m/h. As shown in Table 2, these throughputs can be matched or increased by retrofitting with membranes, even while operating at low flux. Table 2 was constructed assuming that 80% of the footprint of the filter would be covered with modules. Design fluxes of 12 L/m²/h (for raw water) and 16 L/m²/h (for settled water) were assumed. The ZW 1000 modules are about 685 mm (27 inches) high but can be stacked vertically. For some calculations, stacks of two ZW 1000 modules are assumed since such a stack is still within the space available in a typical rapid sand filter. The calculations used to generate FIG. 2 show that these design conditions could generate filtration velocities of 8-22 m/h.

TABLE 2

Example of filtration velocity achievable with different modules

|  | GE Water ZW-1000/700 | GE Water ZW-1000/700 | GE Water ZW-1000/700 | Toray HSU-1515 | Toray HSU-1515 | Asahi UHS-620A |
|---|---|---|---|---|---|---|
| Module type | Rectangular | Rectangular | Rectangular | Round | Round | Round |
| # modules high | 1 | 2 | 2 |  |  |  |
| Module height (m) | 0.7 | 1.5 | 1.5 | 1.3 | 1.3 | 2.2 |
| Module footprint (m²) | 0.0735 | 0.0735 | 0.0735 | 0.0216 | 0.0216 | 0.04 |
| Module surface area (m²) | 65 | 65 | 65 | 20 | 20 | 50 |
| Module tank coverage | 80% | 80% | 80% | 80% | 80% | 80% |
| Flux (L/m²/h) | 12 | 12 | 16 | 12 | 16 | 16 |
| Filtration velocity (m/h) | 8.5 | 17.0 | 22.6 | 8.9 | 11.8 | 16.0 |

Figure 5:
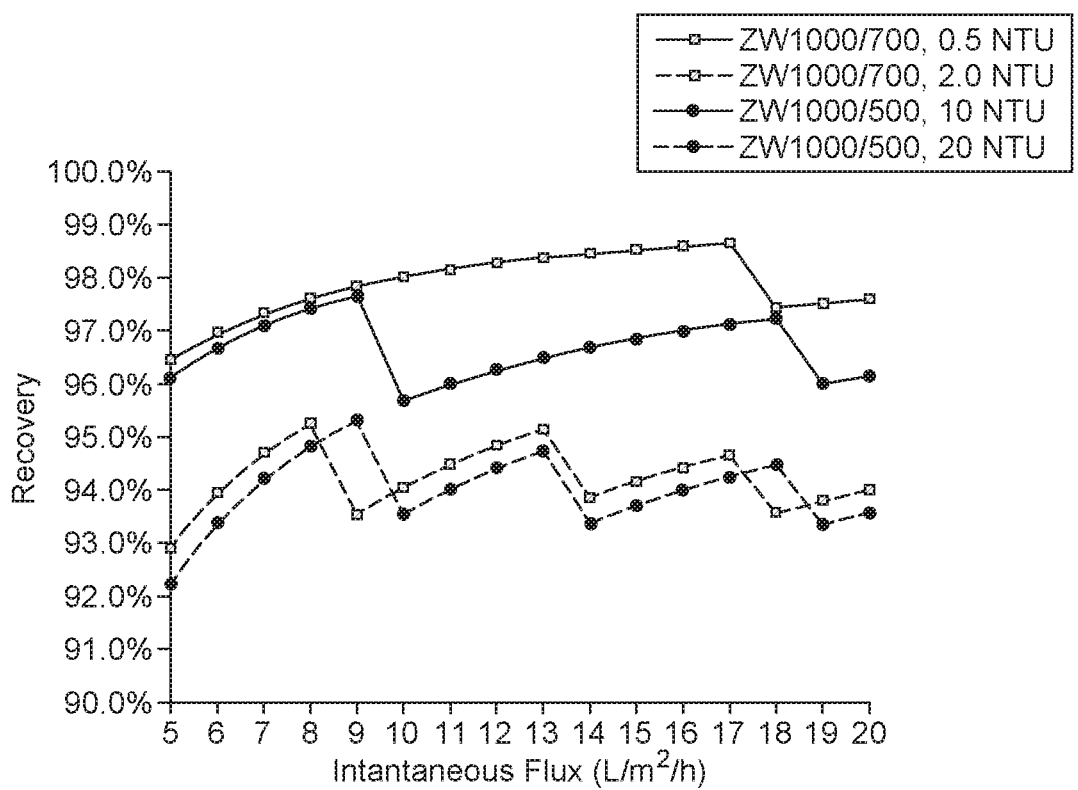
FIG. 5 is a graph showing calculated water recoveries for membrane gravity filters operating over ranges of flux and turbidity.

The membrane gravity filter can be operated without using significantly more water for backwashing than a conventional filter. Media filters typically have recoveries >95%, often around 98% when treating pre-treated (i.e. coagulated and settled) water with low turbidity (<1 NTU). The calculated recovery for a membrane gravity filter operating under different conditions is shown in FIG. 5. The two top curves represent treating settled water and are based on a ZW-1000 module with a surface area of 65 m² and a solids limit of 20 g/module and assuming 1 NTU=1.5 mg/L. It was assumed that one backwash would be performed each day whether or not the solids limit of the modules has been reached. A sudden drop in the curve indicates that the solids limit is reached in less than a day and that an additional backwash is performed at that time. For a turbidity of 0.5 NTU, typical of settled water, recovery increases with flux and a single backwash per day is sufficient up to a flux of 17 L/m²/h. At a flux of 12 L/m²/h, recovery=98.3%. The second curve represents a poorly functioning settler (turbidity=2 NTU). At a flux of 12 L/m²/h, two backwashes per day are needed and the recovery is 96.3%. The two bottom curves represent treating raw water (with turbidity of 10 and 20 NTU) and are based on a ZW-1000 module with a surface area of 46.5 m² and a solids limit of 155 g/module. At a flux of 12 L/m²/h, two backwashes per day would be needed and the recovery would be 94-95%.

To summarize the tests and calculations above, transmembrane pressure (TMP) of about 10-15 kPa was provided to the membrane gravity filters by the gravity (static) head differential of the free surface of water in the tank holding the membranes relative to static head against the permeate outlet. There was no permeate pump. It is estimated that a slightly higher TMP of about 15 kPa, possibly 20 kPa, could be used before increased flux or absolute pressure against the biofilm becomes too much to maintain the intended porous biofilm. Flux did not exceed 20 L/m²/h, typically not exceeding 15 L/m²/h. The membranes were backwashed 1 to 3 times per day. One backwash per day was conducted with 10 mg/L as $Cl_2$ in the backwash water. This backwash lasted for about 5 minutes. Additional backwashes, if any, did not have chlorine or any other cleaning chemically added. Total weekly dosage of chlorine was therefore about 350 minutes*mg/L as $Cl_2$, equivalent to about 732 minutes*mg/L as NaOCl. Backwashes in excess of a predetermined minimum (i.e. once per day) can be triggered by solids concentration or turbidity in the membrane tank exceeding a predetermined maximum.

It is estimated that a backwash frequency between 0.5 and 5 backwashes a day might be acceptable. Backwashes that do not have an oxidant in them could optionally be replaced by a flush of the tank outside of the membranes. In the event that more than 5 backwashes or feed flushes per day would be required to maintain a desired feed water condition in the tank, the feed water could instead be pre-treated such that no more than 5 backwashes per day, or no more than 3 backwashes per day, are required. It is estimated that a weekly dosage of 700 or less, preferably 500 or less, minutes*mg/L as $Cl_2$ would be acceptable, and would provide a porous biofilm layer without substantially killing the biofilm layer. The minimum weekly chlorine dosage is estimated to be 100 minutes*mg/L as $Cl_2$. The depth of submergence of the membranes (the distance between the free water surface of the tank and the lowest active membrane area) is less than 5 meters, optionally less than 2.5 meters or less than 2.0 meters. Optionally, the membranes can be operated for 6 months or more, or 12 months or more, without regenerative cleaning. At a weekly dosage of 700 minutes*mg/L as $Cl_2$ or less, operating the membranes with regenerative cleaning for 6 months without regenerative cleaning would only expose the membranes to no more than 18,200 minutes*mg/L as $Cl_2$.

A membrane gravity filter may be used, for example, for municipal or industrial potable water filtration. The system may be used in place of a media filter such as a rapid sand filter or other conventional filtration system. In a detailed system example below, a conventional gravity sand filter is converted into a membrane gravity filter. The conversion process makes some changes to the conventional filter and its operating mode, but also uses some of the existing components. The changes do not have to be performed in the order described below. The changes described below may also have to be adjusted for different types of existing rapid sand filter.

To convert an existing filter, the existing sand and any other media is removed. Membrane modules are added to the tank, for example by supporting them on the bottom of the tank, on a porous platform that was part of an existing underdrain, or on brackets added to the side or upper edge of the tank. Typically, multiple cassettes or membrane modules are required. A permeate port or pipe from each cassette is connected to a permeate manifold. The permeate manifold is connected to the existing clearwell and to an existing backwash water supply manifold. Transmembrane pressure (TMP) for filtration can be created by the same gravity induced static head differential that was used to drive filtration though the former sand bed. Prior connections between the underdrain and the clearwell and backwash water supply manifold are closed. In some cases, this can be done by connecting the permeate manifold from inside the tank to an existing passage from the underdrain to the outside of the tank. In this case, no new hole is required through the tank wall. Further, if the existing passage was used for both filtered water removal and backwash water supply, a valve operable to isolate the permeate manifold from the clearwell, and a valve operable to isolate the permeate manifold from the backwash water supply manifold, will already be in place. This option can also be used to simultaneously disconnect the existing underdrain from the clearwell and backwash water supply. Alternatively, the permeate manifold may pass through the tank wall through another opening. For example, some rapid sand filters have a tank wall penetration for a washer, which will be obsolete in the membrane system. This penetration can be used, preferably after increasing its size, for the permeate manifold. In other options, an entirely new tank wall perforation or a siphon over the tank wall may be used. In these cases, the permeate manifold is connected from outside of the tank, through isolation valves, to the existing clearwell and to an existing backwash water supply manifold. Depending on how these connections are made (i.e. to a combined clearwell and backwash header or to separate clearwell and backwash headers, upstream or downstream of existing isolation valves) one or more isolation valves might, or might not, need to be added. Further, these connections might, or might not, simultaneously disconnect the existing underdrain from the existing clearwell and backwash water supply. If necessary in any of the options described above, an existing conduit through the tank wall to the underdrain can be closed as a separate step. In some cases, this can be done by closing existing isolation valves. Alternatively, the existing conduit through the tank wall to the underdrain could be used as a tank drain.

Changes to an existing rapid sand filter tank optionally include adding a tank drain to be used for draining the tank after backwashing. In general, this is achieved by connecting the bottom of the tank to an existing backwash wastewater outlet of the existing sand filter. In one option, an existing underdrain discharge conduit may be disconnected from the clearwell and backwash water supply and connected instead through a valve to a backwash water channel. In another option, a new opening is made through the tank wall, preferably at the bottom of the tank, and connected through a valve to a backwash wastewater channel. For example, where the backwash water channel is formed in part by a tank wall shared with the backwash wastewater channel, an opening can be made through the tank wall and fitted with a sluice gate. While this option requires a new opening, the new opening can be larger than the previous underdrain discharge conduit to allow for more rapid tank draining.

In the option above, the troughs are no longer used to collect backwash water. The troughs may be removed or left in place. If the troughs are left in place, feed water can be introduced to the tank through the troughs, which can promote a more even distribution of feed water. However, removing the troughs is preferred. This is because the troughs occupy a significant part of the depth of a tank, and removing the troughs can allow for more membrane modules to be added to the tank. For example, with ZW 1000 modules in some cases a second layer of modules can be added if the troughs are removed.

While backwash water can be removed from the existing troughs, more retained solids can be removed from the tank by draining the tank in a membrane system. With a sand bed, draining the tank would capture retained solids in the sand and so backwash water is discharged from the troughs above the bed. In contrast, water with retained solids can flow vertically downwards through the membrane modules without significant amounts of solids being captured in the module.

Other than the optional removal of the troughs, the feed water supply system of the existing system does not need to be modified.

Optionally, an adsorption cartridge can be added above the module. The adsorption cartridge removes soluble pollutants and may also provide some depth filtration. For example, the adsorption cartridge may contain a granular adsorbent such as activated carbon that has the potential to remove dissolved micro-pollutants.

Membrane modules used with the system may be any immersed membrane modules, preferably with pores in the ultrafiltration or microfiltration range. One suitable module is the ZEEWEED™ 1000 module sold by GE Water & Process Technologies. These modules have horizontal hollow fibres suspended between a pair of opposed, vertically oriented, rectangular potting heads. Shroud plates extend between the potting heads. The modules have a rectangular cross-section in plan view with a vertical flow path for feed water to flow through the module. Multiple modules can be provided in a common frame to form a cassette. The cassette may have one or more layers of modules. If there are multiple layers, the modules are vertically aligned in the cassette such that the vertical flow path is continuous through the cassette.

The adsorption cartridges, if any, are backwashed at the same time as the membranes. Backwash water flows first through the membranes and then through the adsorption cartridges. The water level in the tank rises as backwash water is added, and there is an overall upflow of water through the adsorption cartridges while backwash water is being added. If the troughs were not removed and are being used for backwashing, excess backwash water leaves the tank through the troughs. Alternatively, after the backwash water has been added, a valve (which may be, optionally, a gate) is opened to drain the tank.

The ZW 1000 modules are particularly suitable for use with the adsorption cartridges. A vertical flow path through these modules is bounded by the shroud plates and potting heads. Aerator pipes (and optionally also permeate pipes)

partially occlude the entrance to the flow path at the bottom of the module. Most of the feed water therefore enters the module (or a vertically aligned stack of them) from the above the modules, which encourages feed water to pass through the adsorption cartridges before reaching the modules. Locating the adsorption cartridges above the modules and adding feed water to the tank from above the adsorption cartridges also encourages feed water to pass through the adsorption cartridges before reaching the modules. When the ZW 1000 modules are backwashed, most of the backwash water rises upwards out of the module (or stack) after passing through the membranes. This helps to increase the upward velocity of water flowing through the adsorption cartridges during a backwash, optionally to the point of fluidizing a bed of media in the adsorption cartridges to better release trapped solids. However, other modules may also be used. Similar effects as those can be described above can be achieved with other module designs by placing vertically extending shrouds around the modules and, if necessary, partially blocking flow upwards through the bottom of the module or shrouded area.

Upwards flow through modules can also be enhanced by provided bubbles from below the modules while backwashing. In some cases, an existing filter already has an air blower for providing bubbles in backwash water. The air blower is preferably connected instead to aerators provided with the modules and designed for cleaning the membranes with bubbles.

Optionally, chlorine can be injected in the backwash water to help clean the membranes or maintain their permeability. One example of a membrane operating process with a chlorinated backwash suitable for use with a membrane gravity filter is described in Conversion of Media Filters into Gravity Membrane Filters, U.S. provisional patent application Ser. No. 62/210,915, filed on Aug. 27, 2015, which is incorporated herein by reference. If an adsorption cartridge is used, for example one with granular activated carbon (GAC), the adsorption cartridge can help de-chlorinate the backwash water, which may mitigate the formation of chlorination by-products in the feed water.

An example of a filtration process will be described below. The process can be used with a membrane filtration system, for example a retrofit system as described above or in the more detailed examples below. The process operates in a repeated cycle. In the description below, the cycle is described as starting with an empty tank although, since the process is cyclical, this is an arbitrary starting point.

First, feed water is introduced, for example through an existing or conventional feed distribution system, to fill the tank to a level above the membranes.

Second, feed water is filtered while more feed water is added to the tank. A filtration valve (i.e. an isolation valve between the permeate manifold and a clearwell) is opened and filtered water (permeate) is produced through the membranes. Preferably, most of the feed water enters the membrane module from above, or otherwise after flowing through one or more adsorption cartridges. The adsorption cartridges, if any, remove micro-pollutants as the water flows through them. One or more screens of the adsorption cartridge, or granular adsorption medium in the adsorption cartridges, or both, can also protect the membranes by removing larger particles, if present in the feed water, before they reach the membranes. The feed water is filtered through the membranes, flows through the permeate manifold and out of the tank, for example to a clearwell.

The third step involves back washing (also called back-pulsing) the membranes and backwashing the adsorption cartridges, if any. To initiate a backwash, feed flow is interrupted and a backwash pump is started. The backwash pump pushes permeate, for example from the clearwell, through the membranes in a reverse (to permeation) direction. Most of the permeate water backwashing the membranes exits through the top of the modules and also backwashes the adsorption cartridges. The backwash is preferably enhanced by injecting air at the bottom of the module. During the backwash, granular media may be expanded or fluidized, optionally filling the entire volume of the adsorption cartridges.

A fourth step involves draining the tank. As mentioned above, the backwash water may alternatively be evacuated through backwash troughs as in a conventional rapid sand filter, which would replace the first and fourth steps of this exemplary process. However, the preferred method is to drain the tank, because this allows more nearly complete removal of solids accumulated during the filtering step of the cycle. With the ZW 1000 modules, most of the backwash water (i.e. more than 50%, but optionally more than 80% or more than 90%) flows up through a stack of 1 or more vertically aligned modules, and adsorption cartridges if any. The backwash water can then flow down to a backwash wastewater evacuation port (also called a tank drain) below the modules by flowing through spaces provided for that purpose between the modules or between cassettes of modules. For example, the modules might only occupy 80-90% of the footprint of the tank. The design of the ZW 1000 modules also allows for a smaller amount of flow (for example about 10%) to exit through the bottom of the modules so that the tank can be more fully emptied, and more solids removed, when the tank is drained.

The process then returns to the first step and repeats. The frequency of backwashing may be such that the overall recovery rate is 95% or more. This typically results in backwashing 1 to 3 times per day.

Figure 6:
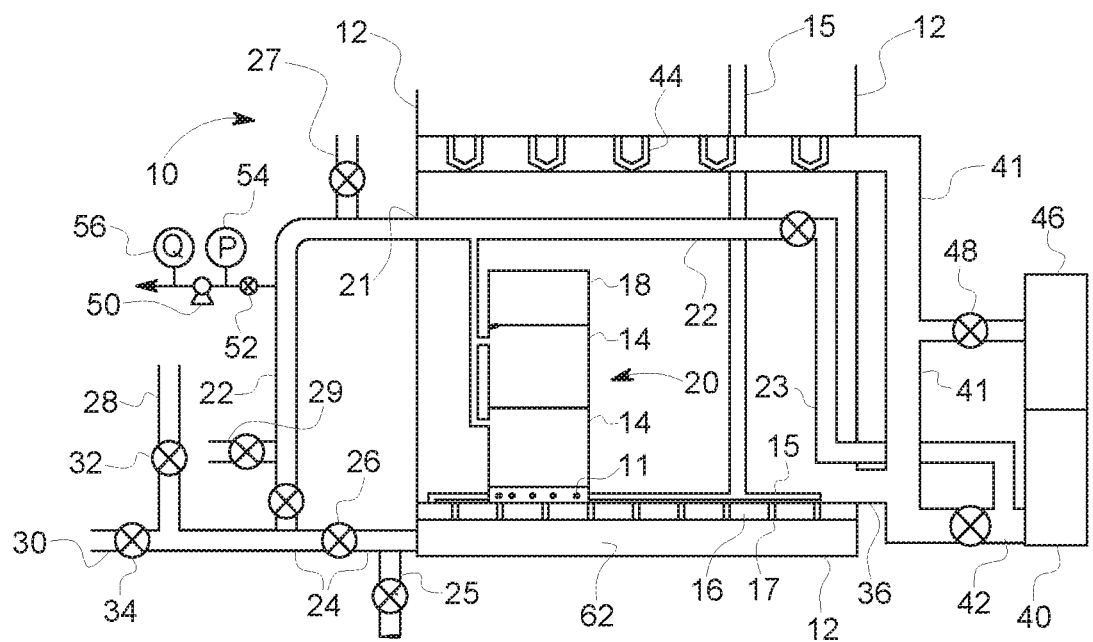
FIG. 6 is a schematic cross section of a membrane filtration system, in particular a gravity sand filter retrofitted into a membrane gravity filter.
Figure 7:
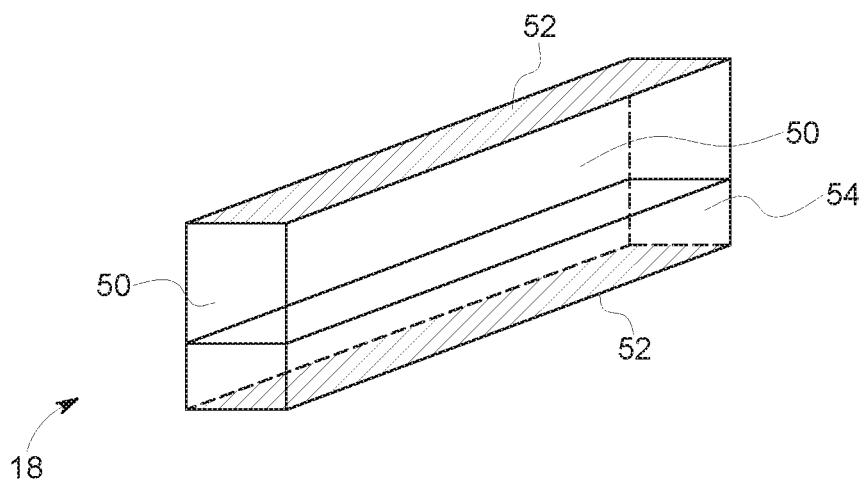
FIG. 7 is an isometric drawing of an adsorption cartridge.

FIG. 6 shows an example of a membrane gravity filter 10 designed as a retrofit for a rapid sand filter. Sand is removed from the tank 12 allowing membrane modules 14 to be placed in the tank 12. In the example shown, the modules 14 are ZW 1000 modules and rest on a porous platform 16, which previously supported the media bed. Optionally, the porous platform 16 (or other underdrain system) could be removed and the modules 14 can be supported directly on the bottom of the tank 12. In another option, the holes 17 in the porous platform 16 can be filled to provide, in effect, a tank bottom at the elevation of the porous platform 16. Two layers of membrane modules 14 are shown, but there may optionally be more (3 or more) or less (1) layers. The modules 14 preferably cover at least 80% of the footprint of the tank 12 but only one cassette of modules 14 is shown in FIG. 6 to simplify the drawing. An optional adsorption cartridge 18 can be snapped or otherwise attached to the top of each module 14. In another option, the modules 14 or adsorption cartridges 18 can be covered with grates that can be walked on during maintenance.

The modules 14 define a vertical flow channel that is open at the top and partially open at the bottom. Most (i.e. 50% or more), but preferably 80% or more or 90% or more, of feed water enters a stack 20 of 1 or more vertically aligned modules 14 from the top of the stack 20. Most (i.e. 50% or more), but preferably 80% or more or 90% or more, of backwash water leaves a stack 20 of 1 or more vertically aligned modules 14 from the top of the stack 20. The modules 14 have an aerator grid 11 near or below the bottom of the lowest module 14 in a stack 20. The aeration grids of the modules 14 are connected to an air supply network 15 leading to one or more air blowers for use in providing bubbles outside of the membranes during backwashes. Optionally, if the rapid sand filter used an air assisted backwash, the air supply network 15 can be connected to one or more pipes and blowers of the existing air supply system.

The permeate outlet of each module 14 is connected to a permeate and back-pulse header 22. The permeate and back-pulse header 22 can be at the top of the stacks 20 as shown or at another level, for example at the bottom of the stacks 20. In the example shown, with the permeate and back-pulse header 22 at the top of the stacks 20, a wall penetration 21 formerly used for a washer in the gravity filter may be at a suitable height and can be enlarged to accommodate the permeate and back-pulse header 22. Alternatively, a new opening can be made in the tank 12 for the permeate and back-pulse header 22. In this case, the washer penetration is covered, filled or otherwise closed. Optionally, the permeate and back-pulse header 22 is also fitted with an air vent 27 and chemical dosing port 29.

The permeate and back-pulse header 22 is connected outside of the tank to an existing underdrain outlet 24. An isolation valve 26 in the existing underdrain outlet 24 is permanently closed. Alternatively, if there is no conveniently located isolation valve 26 then the underdrain outlet 24 can be cut and capped on both ends, for example at about where the isolation valve 26 is shown in FIG. 1. Optionally, if there is an existing tank drain pipe 25 in communication with the bottom of tank 12, it can be left in place for use during maintenance procedures when the entire tank is drained.

The permeate and back-pulse header 22 is connected through the underdrain outlet 24 to a backwash water conduit 30, with a backwash valve 34, and to a filtered water conduit 28, with a filtered water valve 32. These piping connections can be modified as required to make use of existing filtrate and backwash water valves and channels.

Preferably, one or more wall penetrations 36 are added near the bottom of the tank 12 and opens to a feed and drain channel 41. In some cases, the feed and drain channel may be cast integrally with the tank 12. The feed and drain channel 41 is separated from a backwash wastewater channel 40 through a tank drain valve 38, optionally through a backwash wastewater connector 42. The backwash wastewater channel 40 previously received waste backwash from the troughs 44 in the existing filter. While backwash water could still flow to the backwash wastewater channel 40 through the troughs 44, adding the wall penetrations 36 allows the tank 12 to be at least partially drained during or after a backwash to remove more of the backwashed solids from the tank 12. Optionally, the permeate and back-pulse header 22 can also be connected to the backwash wastewater connector 42 or directly to the backwash wastewater channel 40 to allow permeate to be sent to drain during plant start up procedures.

Alternatively, a tank drain could be provided by connecting the portion of the underdrain outlet 24 between the isolation valve 26 and the tank 12 to the backwash wastewater channel 40. However, in many existing rapid sand filters the backwash wastewater channel 40 is not located near the underdrain outlet 24 and so a longer backwash wastewater connector 42 would be required. Further, a new wall penetration 36 (or multiple new wall penetration 36) can be made larger than the size of the existing underdrain outlet 24 is typically smaller, which allows for faster tank draining.

No changes are required to the raw water feed. FIG. 1 shows the feed water conduit 46 being connected to the tank 12 through a feed valve 48 and the existing troughs 44, but other feeding systems are possible. For example, the troughs 44 may be removed.

The adsorption cartridge 18 is shown in greater detail in FIG. 2. The horizontal cross-section of the adsorption cartridge 18 is generally the same as the horizontal cross section of a module 14. The adsorption cartridges 18 is adapted to be easily attached to, and removed from, a module 14. Alternatively, the adsorption cartridge 18 could be larger and cover several modules 14. The adsorption cartridge 18 has solid vertical walls 50 defining its perimeter. Screens 52 at the top and bottom of the walls 50 create an enclosed space. The screens 52 may have openings of about 0.5 mm, otherwise as required to retain a bed of granular adsorption medium 54 (e.g., GAC, typically about 1 mm in size) without adding significant resistance to flow. Optionally, the adsorption cartridge 18 is only filled between 30-70%, preferably 40-60%, with a granular adsorption medium 54 to allow for expansion of the bed during backwash. GAC is typically used but a different sorption medium can be selected to preferentially remove different micro-pollutants.

Figure 8A:
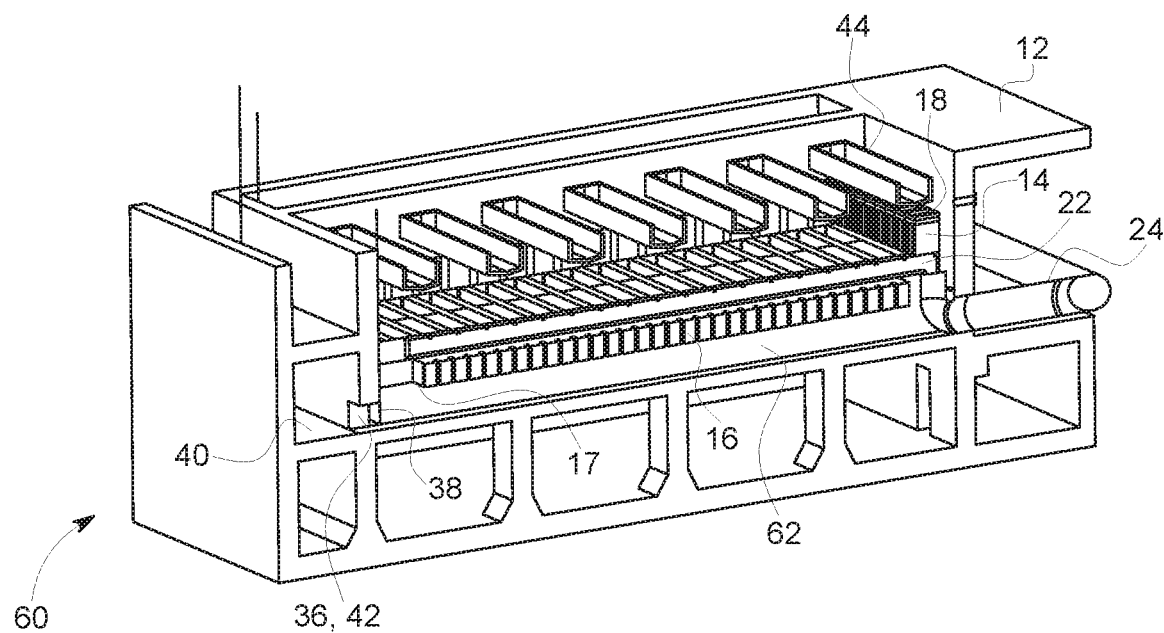
FIG. 8A is a cut-away isometric drawing of another membrane filtration system.
Figure 8B:
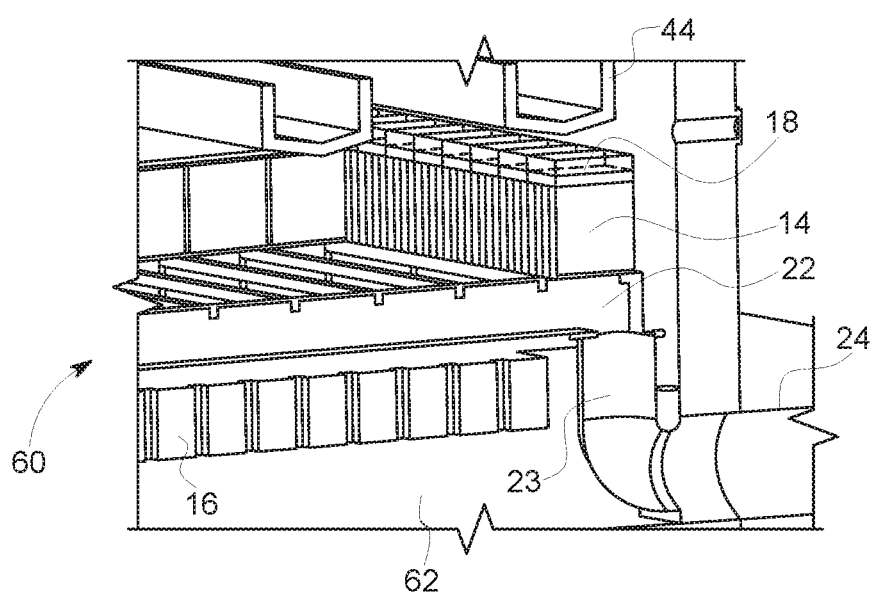
FIG. 8B is an enlarged view of part of FIG. 3A.

FIGS. 8A and 8B show a second membrane gravity filter 60. This system is similar to the membrane gravity filter 10, and the same reference numerals are used to indicate similar or identical parts. However, there are two primary differences between the membrane gravity filter 10 and the second membrane gravity filter 60.

One difference is that in the second membrane gravity filter 60 the tank 12 shares a common wall with a molded concrete backwash channel 40. The wall penetration 36 connects tank 12 to the backwash channel 40 and simultaneously provides a waste backwash water connector 42. A tank drain valve 38 is provided by a sluice gate over the wall penetration 36. An access hole 17 is made through the porous platform 16 to give access to the sluice gate. Alternatively, the porous platform 16 could be completely removed.

The second difference is that the back-pulse header 22 is connected to the underdrain outlet 24 by an adapter 23 located inside of the tank 12. In the example shown, the existing underdrain was made up of a filtered water channel 62 under the porous plate 16. The adapter 23 is fit into the open end of the underdrain outlet 24. Alternatively, if the underdrain had been made up of a network of pipes covered in gravel, the gravel would be removed and the network of pipes would be cut away from the underdrain outlet 24 before the adapter 23 is fitted.

Optionally, membrane integrity can be tested while the tank is empty using the method described in U.S. Pat. No. 6,228,271, which is incorporated by reference. This method involves very little downtime since it can be performed while the tank is drained to remove solids after a backwash. Very little equipment is required, and there is little risk of damaging the membranes. However, the inventors are not aware of any use of this method in a full size membrane filtration plant. The reason for this may be that the test requires very high suction pressure to find a defect of a size just large enough to pass various parasites of concern, for example *Cryptosporidium*, in a high flux system. However, a conventional rapid sand filter does not completely remove these parasites and is instead typically coupled with downstream disinfection, for example by ozone or chlorine. Further, a membrane gravity filter does not operate at high flux. When converting a rapid sand filter to a membrane gravity filter, a membrane integrity test is required only to, for example, determine if any hollow fiber membranes are broken, or to confirm that the filter is operating at a log reduction value (LRV) of 3.5 or more. These results can be achieved practically with an empty tank membrane integrity test.

In an empty tank membrane integrity test, a pump is used to apply suction to the permeate side of a membrane. Higher suction pressure increases the resolution of the test. The test is conducted when the tank is empty by applying a specified suction pressure and measuring the water flow rate. A perfectly integral system will not produce any flow rate. A real system will produce a flow rate that can be mathematically converted, by way of the Yonge and Laplace equation, to the size of a single defect that would produce the same flow rate. Alternatively, the flow rate can be converted by the equations in U.S. Pat. No. 6,228,271, reproduced below, to a log reduction value.

Young and Laplace Equation for defect size (d):

$$d = \frac{4\gamma \cdot \cos\theta}{\Delta P}$$

Leakage flow rate:

$$Q_{leak} = \frac{Q_{test}}{f_1 \cdot f_2}$$

Log reduction value:

$$LRV = \log_{10}\left[\frac{Q_{leak}}{Q_{filt}}\right]$$

Viscosity correction factor:

$$f_1 = \frac{\mu_{water}}{\mu_{air}}$$

Pressure correction factor:

$$f_2 = \frac{[P_{atm}^2 - P_{test}^2]}{2 \cdot \Delta P_{filt} \cdot P_{test}}$$

The flow rate measurement has to be made before air reaches the device producing the suction. For example, as shown in FIG. 6, a suction pump 50 is added to the permeate header 22 through an MIT valve 52. The pump speed is increased until a pressure gage 54 shows that the specified test suction pressure has been reached. The MIT valve 52 is then opened, and flow rate is measured through flow meter 56. Optionally, the suction pump 50 may be replaced by a tube extending downwards to produce a siphon.

Retrofitting a large rapid sand filter could require 1000 or more ZW 1000 modules operating at about 15 L/m²/h. The permeate header contains about 2.4 m³ of water. A test sufficient to find defects equal to a single hole of 3-4 mm in diameter would require a suction pressure of about 0.5 bar. Under these conditions, defects sufficient to reduce the LRV of the system to 3.5 would generate a flow of 60-70 m³/h and the test duration would be limited to 2 minutes. Alternatively, a suction pressure of 1.5 m applied by siphon would be sufficient to find defects equal to a single hole of 9-14 mm in diameter (depending on elevation in the module). Under these conditions, defects sufficient to reduce the LRV of the system to 3.5 would generate a flow of 13-15 m³/h and the test duration would be limited to 10 minutes.

A simple test without a pump is sufficient to determine if the system is operating at an LRV of at least 3.5 or not. Under the conditions described above, a test flow rate of less than 13 m³/h is a "PASS" while a test flow rate of 13 m³/h or more is a "FAIL".

We claim:

1. A method of converting an existing rapid sand filter to a membrane filtration system comprising steps of,
   removing granular filtration media from a tank of the existing rapid sand filter;
   adding immersed membrane modules to the tank of the existing rapid sand filter;
   connecting permeate outlets of the immersed membrane modules to an effluent conduit and to a backwash water supply pipe of the existing rapid sand filter; and,
   connecting an opening in the tank below the immersed membrane modules to a backwash wastewater conduit of the existing rapid sand filter,
   wherein the opening is formed in a common wall shared by the tank and the backwash wastewater conduit.

2. The method of claim 1 comprising fitting a controllable gate to the opening in the common wall.

3. The method of claim 1 comprising connecting the permeate outlets of the immersed membrane modules to an existing underdrain outlet of the existing rapid sand filter.

4. The method of claim 3 wherein the connection to the existing underdrain outlet of the existing rapid sand filter is made from inside of the tank.

5. A method of converting an existing rapid sand filter to a membrane filtration system comprising steps of,
   removing granular filtration media from a tank of the existing rapid sand filter;
   adding immersed membrane modules to the tank of the existing rapid sand filter;
   connecting permeate outlets of the immersed membrane modules to an effluent conduit and to a backwash water supply pipe of the existing rapid sand filter;
   connecting an opening in the tank below the immersed membrane modules to a backwash wastewater conduit of the existing rapid sand filter; and,
   adding sorption cartridges to the tank.

* * * * *